(12) United States Patent
Bordoli et al.

(10) Patent No.: US 12,240,160 B2
(45) Date of Patent: Mar. 4, 2025

(54) PROCESS FOR THE PREPARATION OF AN ARTICLE BY POWDER INJECTION MOLDING

(71) Applicant: STRAUMANN HOLDING AG, Basel (CH)

(72) Inventors: Gabriele Bordoli, Villeret (CH); Bruno Buergisser, Alterswil (CH); Marc Stephan, Basel (CH); Stéphane Courvoisier, Villeret (CH)

(73) Assignee: STRAUMANN HOLDING AG, Basel (CH)

( * ) Notice: Subject to any disclaimer, the term of this patent is extended or adjusted under 35 U.S.C. 154(b) by 0 days.

(21) Appl. No.: 17/262,938

(22) PCT Filed: Jul. 22, 2019

(86) PCT No.: PCT/EP2019/069692
§ 371 (c)(1),
(2) Date: Jan. 25, 2021

(87) PCT Pub. No.: WO2020/020830
PCT Pub. Date: Jan. 30, 2020

(65) Prior Publication Data
US 2021/0187806 A1 Jun. 24, 2021

(30) Foreign Application Priority Data
Jul. 28, 2018 (EP) .................................. 18185115

(51) Int. Cl.
*B29C 45/00* (2006.01)
*A61C 8/00* (2006.01)
(Continued)

(52) U.S. Cl.
CPC ............ *B29C 45/585* (2013.01); *A61C 8/005* (2013.01); *A61C 13/0006* (2013.01);
(Continued)

(58) Field of Classification Search
CPC .................................................... B29C 45/585
See application file for complete search history.

(56) References Cited

U.S. PATENT DOCUMENTS 3,346,924 A   10/1967  Lombard
3,608,623 A    9/1971  Woltering
(Continued)

FOREIGN PATENT DOCUMENTS

CN     104525953 A    4/2015
CN    107 598 170 A   1/2018
(Continued)

OTHER PUBLICATIONS

Health Belgium. "Ultrasound and High Frequency Sound." FPS Public Health, Dec. 1, 2016, https://www.health.belgium.be/en/ultrasound-and-high-frequency-sound#:~. (Year: 2016).*

(Continued)

*Primary Examiner* — Alison L Hindenlang
*Assistant Examiner* — Andres E. Behrens, Jr.
(74) *Attorney, Agent, or Firm* — Oliff PLC

(57) ABSTRACT

A process for the preparation of an article by powder injection molding, the process including the steps of providing a feedstock containing a powder of a ceramic, a metal or a metal alloy dispersed in a binder, heating the feedstock, and injecting the heated feedstock into a mold cavity of a mold, where it cools and hardens to the configuration of the mold cavity. The process is characterized in that step c) is carried out under the application of vibrational energy onto the feedstock.

13 Claims, 5 Drawing Sheets

(51) Int. Cl.

| | | |
|---|---|---|
| *A61C 13/00* | (2006.01) | |
| *B22F 3/00* | (2021.01) | |
| *B22F 3/22* | (2006.01) | |
| *B28B 1/00* | (2006.01) | |
| *B28B 1/087* | (2006.01) | |
| *B28B 1/24* | (2006.01) | |
| *B29C 45/58* | (2006.01) | |
| *B29C 45/62* | (2006.01) | |
| *B29C 45/74* | (2006.01) | |
| *B29K 103/06* | (2006.01) | |
| *B29L 31/00* | (2006.01) | |

(52) U.S. Cl.
CPC .............. *B22F 3/225* (2013.01); *B28B 1/087* (2013.01); *B28B 1/24* (2013.01); *B29C 45/0001* (2013.01); *B29C 45/62* (2013.01); *B29C 45/74* (2013.01); *B22F 2202/01* (2013.01); *B29K 2103/06* (2013.01); *B29L 2031/7532* (2013.01)

(56) References Cited

U.S. PATENT DOCUMENTS

| | | | |
|---|---|---|---|
| 3,986,805 A | 10/1976 | Haines | |
| 4,017,239 A | 4/1977 | O'Connell et al. | |
| 4,100,962 A | 7/1978 | Housman | |
| 4,751,029 A | 6/1988 | Swanson | |
| 4,790,738 A | 12/1988 | Shimojo et al. | |
| 5,017,311 A * | 5/1991 | Furusawa | B29C 45/568 264/71 |
| 5,204,127 A | 4/1993 | Prusha | |
| 5,238,394 A | 8/1993 | Hirata | |
| 5,249,951 A | 10/1993 | Leonhartsberger et al. | |
| 5,792,492 A | 8/1998 | Takahashi | |
| 6,095,786 A | 8/2000 | Inoue et al. | |
| 6,280,193 B1 | 8/2001 | Peltier | |
| 6,464,485 B1 | 10/2002 | Iida et al. | |
| 8,408,905 B2 | 4/2013 | Hayashi et al. | |
| 2006/0249864 A1 | 11/2006 | Saito et al. | |
| 2008/0254409 A1 | 10/2008 | Hwang et al. | |
| 2009/0029317 A1 * | 1/2009 | Hayashi | A61C 8/0075 433/201.1 |
| 2009/0208360 A1 | 8/2009 | Wilkinson | |
| 2010/0047557 A1 | 2/2010 | Baumann et al. | |
| 2012/0237385 A1 * | 9/2012 | Wilkinson | B22F 3/093 425/78 |
| 2012/0301849 A1 | 11/2012 | Wang et al. | |
| 2013/0345384 A1 | 12/2013 | Rendon et al. | |
| 2015/0171717 A1 * | 6/2015 | Wakade | H01F 1/0577 29/598 |

FOREIGN PATENT DOCUMENTS

| | | | | |
|---|---|---|---|---|
| DE | 3817234 C2 * | 7/1995 | ........... | B29C 45/585 |
| DE | 19530981 A1 | 2/1997 | | |
| DE | 102010013544 A1 * | 9/2011 | ................ | B22F 3/02 |
| EP | 1570804 A1 | 9/2005 | | |
| JP | H03-213311 A | 9/1991 | | |
| JP | H08-267508 A | 10/1996 | | |

OTHER PUBLICATIONS

DE-10 2010/013,544 (Gschwinder) Sep. 2011 (online machine translation), [Retrieved on Jan. 25, 2022]. Retrieved from: Google Patents (Year: 2011).*
DE-102010013544 (Nikita) Sep. 2011 (online machine translation), [Retrieved on May 23, 2022]. Retrieved from: Espacenet & Google (Year: 2011).*
Bozzelli, John. "Injection Molding: Get Control Over Barrel Zone Temperature Override." Plastics Technology, Dec. 21, 2015 www.ptonline.com/articles/injection-molding-get-control-over-barrel-zone-temperature-override. (Year: 2015).*
Sepe, Michael. "The Importance of Melt and Mold Temperature." Plastics Technology, Nov. 28, 2011 www.ptonline.com/articles/the-importance-of-melt-mold-temperature. (Year: 2011).*
"Ultrasound and High Frequency Sound." FPS Public Health, Dec. 1, 2016, www.health.belgium.be/en/ultrasound-and-high-frequency-sound. (Year: 2016).*
Srebrenkoska, Vineta, et al. "Preparation . . . " Macedonian Journal of Chemistry and Chemical Engineering, vol. 28, No. 1, Jun. 2009, p. 99. https://doi.org/10.20450/mjcce.2 (Year: 2009).*
DE-3817234 (Brams) Jul. 1995 (online machine translation), [Retrieved on Jun. 12, 2023]. Retrieved from: Espacenet (Year: 1995).*
Sep. 4, 2019 International Search Report issued in International Patent Application No. PCT/EP2019/069692.
Jan. 26, 2021 International Preliminary Report on Patentability issued in International Patent Application No. PCT/EP2019/069692.
J. Grabalosa et al., Influence of processing conditions on manufacturing polyamide parts by ultrasonic molding, Materials and Design 98 (2016), 20-30.
Sacristan et al, Effects of ultrasonic vibration on the micro-molding processing of polylactide, Ultrasonics Sonochemistry 21 (2014) 376-386.
J. Grabalosa et al., "Influence of Processing Conditions On Manufacturing Polyamide Parts By Ultrasonic Molding", Materials and Design 98 (2016), pp. 20-30.
Sacristan et al., "Effects of Ultrasonic Vibration On the Micro-Molding Processing of Polylactide", Ultrasonics Sonochemistry 21, (2014), pp. 376-386.
Sep. 4, 2019 Search Report issued in Intenational Patent Application No. PCT/EP2019/069706.
Sep. 4, 2019 Written Opinion issued in Intenational Patent Application No. PCT/EP2019/069706.
Jan. 26, 2021 International Preliminary Report on Patentability issued in Intenational Patent Application No. PCT/EP2019/069706.
Jun. 20, 2022 Office Action issued in Chinese Patent Application No. 201980049133.9.
Liu, Bin et al. "Effects of Vibration Force Field on Melt Rheological Properties and Phase Isolation During Metal Powder Injection Molding," Journal of South China University of Technology. Jun. 2010, vol. 38, No. 6, pp. 146-150.
Mar. 3, 2023 Office Action issued in Chinese Patent Application No. 201980049133.9.
Feb. 26, 2024 Office Action issued in U.S. Appl. No. 17/262,814.
Jul. 2, 2024 Office Action issued in U.S. Appl. No. 17/262,814.
Sep. 9, 2024 Notice of Allowance issued in U.S. Appl. No. 17/262,814.

* cited by examiner

PROCESS FOR THE PREPARATION OF AN ARTICLE BY POWDER INJECTION MOLDING

The present invention relates to process for the preparation of an article by powder injection molding according to the preamble of claim 1 and to a powder injection molding apparatus for carrying out the process. The invention further relates to the use of the powder injection molding apparatus for the preparation of a dental article, in particular a dental implant or a dental implant abutment.

Ceramic dental implants or implant abutments are typically prepared by pressing a ceramic powder dispersed in a binder to a so-called green body, followed by a removal of the binder from the green body in a debinding (or "debindering") step to form a brown body, which is then sintered and subjected in some cases to hot isostatic processing (HIP), typically followed by grinding the body.

For providing complex structural features to the article to be produced, such as an outer thread of the dental implant (for screwing it into bone and obtaining a primary stability after implantation) or an inner thread (for connecting an abutment to the dental implant), the sintered body is then subjected to a machining step.

In aiming at avoiding laborious post-treatment steps, such as HIP and grinding, and reducing the effort for machining the final geometry out of the sintered body, suggestions have been made in the past to prepare implants or implant abutments by injecting molding techniques.

EP-A-1570804, for example, discloses a dental implant comprising an outer body made of ceramic or metal and an inner body made of metal or ceramic, wherein the metal body is produced by metal injection molding (MIM) and the ceramic body is produced by ceramic injection molding (CIM).

Further, DE-A-19530981 discloses a post system of an implant structure, the post being formed by injection molding a composition comprising polyoxymethylene and zirconium dioxide powder.

U.S. Pat. No. 6,280,193 relates to a dental implant comprising zirconium oxide, having an external thread screwable in the osseous tissues and an internal tapping obtained by molding.

A zirconium oxide dental implant manufactured by injecting a zirconium oxide paste in a mold for obtaining a green body and sintering the green body to the zirconium oxide dental implant, is further disclosed in US 2012/0301849.

Although complex structures can in theory be obtained by CIM or MIM (both falling within the definition of powder injection molding, briefly PIM), it has been found that conventional PIM techniques result in a relatively poor process stability. In particular, implant or implant abutments prepared by conventional CIM or MIM are prone to surface defects, due to the high viscosity of the feedstock and therefore an imperfect filling of the mold cavity.

In principle, an improvement of the flow behaviour of the feedstock could be achieved by a pre-heating of the mold, thus prolonging hardening of the feedstock and, hence, the window for injection. Pre-heating, however, requires cooling of the mold before demolding the molded article. Overall, this results in longer cycle times for producing the implant or implant abutment; these prolonged cycle times are, however, to be avoided in a large-scale production process, where a high throughput is aimed at.

The problem to be solved by the present invention is thus to provide a stable ceramic injection molding (CIM) or metallic injection molding (MIM) process which allows for an improved filling of the mold cavity without an increase in the cycle time. Ultimately, molded articles of a decreased surface porosity and of an improved volume flaw distribution, like e.g. flow-lines and decompositions, shall be obtained by the present invention, resulting in an improved bend strength of the molded article, even if complex geometries are to be provided by the molding process.

The problem is solved by the process of claim 1. Preferred embodiments are defined in the dependent claims.

According to claim 1, the process of the present invention relates to a powder injection molding process, which encompasses both metallic injection molding and ceramic injection molding.

The process comprises the steps of
a) providing a feedstock containing a powder of a ceramic, a metal or a metal alloy dispersed in a binder,
b) heating the feedstock, and
c) injecting the heated feedstock into a mold cavity of a mold, where it cools and hardens to the configuration of the mold cavity.

According to the invention, step c) is carried out under the application of vibrational energy onto the feedstock.

As will be shown in detail below, this allows for simple and time-saving preparation of molded articles of decreased surface porosity and volume flaws and, hence, of improved bend strength.

Typically, the process comprises the further steps of debinding and sintering the article. As will be pointed out in further detail below, it is particularly preferred that the process comprises the further step of subjecting the article to a machining process for preparing the finished article, which results in a further improvement of the article's bend strength.

In the context of the present invention, it has been found that a complete filling of the mold cavity and, hence, an accurate replication of structural details in the molded article can be achieved, despite the high viscosity of the feedstock used for the molding. Surprisingly, it has further been found that the tendency for the formation of cracks or porosities is much lower than with previously described PIM techniques. By diminishing such surface and volume defects, a higher bend strength of the article to be produced can ultimately be achieved.

Without wanting to be bound by the theory, it is assumed that the improved filling of the mold cavity is at least partially owed to the fact that the application of vibrational energy results in a reduction in the frictional force between the powder particles and between powder particles and the inner surface of the mold cavity. This reduction in the frictional force has been most surprising, since the powder particles are dispersed in a binder, which is generally assumed to dampen vibration.

In addition, the application of vibrational energy induces an additional heating of the feedstock, further reducing the viscosity of the feedstock to be injected. This effect also contributes to an improved filling of the mold cavity.

Given the combined effects of a reduced friction between the powder particles and between powder particles and the mold cavity's inner surface as well as a lower viscosity induced by additional heating, even very delicate configurations of the mold cavity are accurately replicated, and articles of complex structures can therefore be achieved, which nevertheless exhibit a high bend strength. Specifically, a bend strength improvement of 20% or more can be achieved, as will be explained in detail in the context of the specific working examples discussed below.

According to a particularly preferred embodiment of the present invention, the mold cavity is subjected to vibration at a frequency corresponding to the resonant frequency of the mold. It is thereby particularly preferred that the mold is subject to vibration at a frequency above 10 kHz, preferably above 16 kHz, more preferably of at least 20 kHz and most preferably of at least 30 kHz.

It is further preferred that the frequency of the vibration is below 1 GHz, more preferably below 40 kHz. According to a particularly preferred embodiment, the mold is subjected to vibration in a frequency band between 20 kHz and 40 kHz. According to another particularly preferred embodiment showing experimentally a particularly stable resonant frequency, the mold is subjected to vibration in a frequency band between 17 kHz and 24 kHz.

By setting the vibration to a frequency defined above, the mold acts as a resonator, vibrating with standing waves at its resonant frequency, so that the wall of the mold cavity vibrates correspondingly, and thereby applying vibrational energy to the feedstock. This allows for a very simple design of the injection molding process and apparatus. In particular, there is according to this embodiment no need for providing a separate sonotrode, as it has been described in the scientific literature for polymeric injection molding techniques using ultra-sound, such as for example the techniques described by J. Grabalosa et al., *Influence of processing conditions on manufacturing polyamide parts by ultrasonic molding, Materials and Design* 98 (2016), 20-30 or by Sacristan et al, *Effects of ultrasonic vibration on the micro-molding processing of polylactide, Ultrasonics Sonochemistry* 21 (2014) 376-386, in which ultrasound is applied to a container of polymeric pellets by means of a sonotrode.

In the present application, the term "resonant frequency" is used to characterize the resonant frequency itself or multiples of this resonant frequency.

The differences between the design of the preferred embodiment of the present invention mentioned above and the design of polymeric injections molding techniques discussed in the scientific literature reflect their different concepts: while in the known polymeric injection molding techniques, ultrasound is used for melting defined amounts of polymeric pellets prior to injection, the present invention aims at a reduction between the frictional force between powder particles, in particular during injection into the mold cavity. Thus, the feedstock injected by CIM or MIM, to which the present invention refers, comprises solid powder particles, which is in clear contrast to the polymeric injection molding techniques injecting a melted (and therefore liquid) polymer.

As mentioned, the application of vibrational energy according to the process of the present invention serves to improve the flowability of the ceramic or metallic feedstock and ultimately the filling of the mold cavity in a CIM or MIM process. It is thus also in clear distinction from techniques using ultrasonic vibration for the welding of polymeric components.

According to the present invention, the feedstock is typically heated in an injection unit, more specifically in a barrel of an injection unit, where it is conveyed from a feed zone of the barrel towards a nozzle and from which it is transferred, optionally under further heating, through a transfer channel to the mold cavity. In particular, heating of the feedstock in the injection unit and/or the transfer channel is primarily achieved by conventional heating means. Specifically, the feedstock is conveyed in the barrel by means of a conveying screw and plastification can be achieved by friction generated by rotation of the screw, optionally combined with further heating elements.

As the case may be, it can be further preferred to subject also the injection unit and/or the transfer channel to vibration at a frequency corresponding to the resonant frequency of the injection unit and/or the transfer channel, respectively. Like the vibrational energy applied on the mold, the vibrational energy applied on the injection unit and/or transfer channel is preferably at frequency of at least 10 kHz. More preferably, it is above 15 kHz and most preferably is in a frequency band between 20 kHz and 40 kHz. Thus, the same vibrational energy generator and transducer can be used for the mold as well as for the injection unit and/or the transfer channel.

Preferably, the temperature scheme is such that directly before injection, i.e. at the nozzle of the transfer channel, the temperature of the feedstock is in a range from 160° C. to 200° C.

During injection, which normally takes place within about 0.5 to 1 second, the improved flowability of the feedstock allows for an extended injection window, since at the injection point (or gate) the hardening of the feedstock is prolonged. During the subsequent holding phase, whereby—after injection—additional pressure is applied for about 10 seconds, also very delicate structures of the mold cavity are accurately transferred to the article, as mentioned above.

Typically, the temperature, at which the mold is kept, depends on the specific feedstock used and is chosen such to allow a good flowability of the feedstock during injection into the mold cavity. Preferably, the mold is kept at a temperature in a range from room temperature to 60° C., preferably from 40° to 60° C., more preferably from 40° to 50° C., and most preferably at about 50° C. There is according to this preferred embodiment no need for cooling the mold before demolding of the article, which allows the process of the present invention to be applied in large-scale and at a high throughput.

The holding pressure applied during the holding phase is preferably between about 300 bar and about 1200 bar, more preferably between about 400 bar and 1000 bar, and most preferably between about 600 bar and 900 bar. It is, however, understood that the optimum holding pressure can vary depending on the specific feedstock used.

As mentioned above, step c) of the process of the present invention further comprises sub-steps of
c') debinding the hardened article and
c") sintering the debinded article.

Typically, the debinding is carried out at a temperature in a range from about 400° C. and 500° C. and specifically at about 450° C., whereas the sintering is typically carried out at a temperature in a range from about 1400° C. and 1500° C. and specifically at about 1450° C.

As also mentioned above, a particularly preferred embodiment of the process comprises the further step of d) subjecting the article obtained in step c) (including sub-steps c' and c") to a machining process.

Owed to the machining, a further improvement in the bend strength can be achieved, resulting in an article having a comparable bend strength than a respective article that has been produced using the conventional uniaxial pressing (UP) techniques.

With regard to the specific application of the process of the present invention to the production of a dental implant, it can thus be particularly preferred to prepare in step c) an article exhibiting the inner geometry of the final implant, specifically the inner thread for co-operating with an outer thread of an abutment to be fixed on the implant, and to provide the outer thread in a subsequent machining step d). Ultimately, a ceramic dental implant can thus be achieved, which has a bend strength comparable to the bend strength of conventional ceramic dental implants, but for which the production in large scale is much simpler and therefore less expensive than known UP techniques.

It is understood that apart from the specific process for producing a dental implant mentioned above, also processes are encompassed by the present invention, in which both the inner and the outer geometry of the dental implant, specifically the inner thread and outer thread, are provided in step c). Since for these processes, a machining step can be omitted completely, they are even simpler and less expensive, however at the cost of a somewhat lower bend strength.

The choice of the feedstock depends on the type and the application of the article to be produced. For producing a dental article, such as a dental implant or dental implant abutment, a feedstock of yttria-stabilized zirconia with particles of less than about 4 μm in diameter and with less than 50 vol.-% having a diameter of more than 0.6 μm is preferred. A feedstock of yttria-stabilized zirconia with particles of less than about 4 μm in diameter and with less than 50 vol.-% having a diameter of more than 0.08 μm is particularly preferred. In this regard, very fine particles down to the submicron or nano-scale are thinkable. The powder is dispersed in a thermoplastic binder at a high concentration. The term "binder" as used in the context of the present invention encompasses binder systems comprising more than one thermoplastic component. For example, polyethylene (PE), polypropylene (PP), polystyrene (PS), polyoxymethylene (POM), polyacrylamide (PA), ethylene-vinyl acetate (EVA) and/or polymethylacrylate (PMMA) can be used as a thermoplastic component. Also further additives could be used like plasticizers (like paraffin wax (PW) or polyethylene glycol (PEG)) and/or processing aids (like stearic acid (SA) and/or oleic acid (OA)).

Specific zirconia containing feedstocks, which have been found suitable for the process of the present invention include, for example, PXA 233PH, PXA 211PH, TCP 0036 (all from Tosoh Corporation, Tokyo, Japan) and Catamold® TZP-A (from BASF, Ludwigshafen, Germany). Among these feedstocks, PXA 233PH (comprising zirconia powder of the type TZ-3YS-E with particles of less than 4 μm in diameter and with less than 50 vol.-% having a diameter of more than 0.7 μm) and PXA 211PH (comprising zirconia powder of the type TZ-3Y-E with particles of less than 4 μm in diameter and with less than 50 vol.-% having a diameter of more than 0.6 μm) are particularly preferred for the process of the present invention.

Apart from the process mentioned above, the present invention also relates to a powder injection molding (PIM) apparatus for carrying out the process.

Specifically, the powder injection molding apparatus of the present invention comprises
 A) an injection unit containing a heatable barrel, a nozzle and conveying means, in particular a conveying screw, arranged in the barrel for conveying feedstock in direction from a feed zone of the barrel towards the nozzle, and
 B) a mold enclosing a mold cavity fluidically connected with the injection unit via a transfer channel.

According to the invention, the apparatus further comprises
 C) a vibrational energy generator and a transducer for transducing the vibrational energy received from the vibrational energy generator to the mold and optionally to the injection unit and/or to the transfer channel.

It is preferred that between the transducer and the mold, the apparatus further comprises an amplitude transformer (or "booster") for transforming the wave amplitude of the vibrational energy received from the transducer and transferring it to the mold. As will be shown in more detail by way of the working examples below, a particularly high bend strength can be achieved, if the article is produced using an amplitude transformer in the apparatus.

Vibrational energy generators, transducers and amplitude transformers are known from polymeric injection molding techniques, and the skilled person who has become aware of the present invention readily knows how to apply these components to the powder injection molding apparatus defined above.

In analogy to what has been described in the context of the process of the present invention, the transducer or, as the case may be, the amplitude transformer of the apparatus is in direct contact with the mold and optionally the injection unit and/or the transfer channel. A direct contact is preferred to limit the number of interfaces and consequently the vibrational energy dispersion in the apparatus. According to this embodiment, the apparatus is therefore devoid of a separate sonotrode designed for vibrating with standing waves at its resonant frequency, since according to a particularly preferred embodiment of the invention, it is the mold that acts as resonator or sonotrode.

In this regard, the mold is preferably formed of one piece. In other words, the mold has the configuration of a so-called mono-bloc configuration as opposed to e.g. a bi-bloc configuration, which is formed of two pieces with a parting line between the pieces. Owed to the absence of a parting line in the mono-bloc configuration, the mold can be efficiently brought into vibration at its resonant frequency and the vibrational energy can be efficiently applied to the feedstock.

In another preferred embodiment where the powder injection molding apparatus has a bi-bloc configuration, the mold comprises a first mold part and a second mold part.

The first mold part has a first contact surface facing the second mold part in the assembled state and the second mold part has a second contact surface facing the first mold part in the assembled state. The first and the second contact surface form in the assembled state a so-called parting line in the form of a parting surface owed to the essentially two-dimensional interface between the first mold part and the second mold part.

Preferably, the first and the second contact surface extend each in a plane parallel to each other. Such an interface allows for an efficient contacting of the first mold part and the second mold part.

In the assembled state of the mold, the mold encloses a mold cavity fluidically connected with the injection unit via a transfer channel.

Depending on the complexity of the structures of the molded articles to be achieved, the mold can also have more than two mold parts.

The position of the mold cavity with respect to the parting surface can be defined depending on the structural features of the article to be produced. Preferably, the mold cavity is symmetrical with respect to the parting surface to allow an easy adjustment of the vibrational energy needed to reach the resonant frequency of the mold.

Further, the powder injection molding apparatus comprises an injection unit containing a heatable barrel, a nozzle and conveying means arranged in the barrel for conveying feedstock in direction from a feed zone of the barrel towards the nozzle.

Moreover, the powder injection molding apparatus comprises a vibrational energy generator and a transducer for transducing the vibrational energy received from the vibrational energy generator to the mold and optionally to the injection unit and/or to the transfer channel. The vibrational energy generator and the transducer used in the mono-bloc configuration previously described can also be used in the present bi-bloc configuration.

In addition, the powder injection molding apparatus comprises a clamping unit designed to retain the first mold part and the second mold part in contact with each other under the effect of a clamping force.

According to the invention, the first mold part and the second mold part comprise a first retaining hole and a second retaining hole, respectively, each extending essentially perpendicularly to the parting surface and arranged opposite to each other respective to the parting surface.

Further, the clamping unit comprises a first pin and a second pin each extending essentially perpendicularly to the parting surface, wherein the first pin and the second pin are designed to be inserted in the first retaining hole and in the second retaining hole, respectively, to cooperate in the assembled state of the mold with a retaining portion of the first retaining hole and with a retaining portion of the second retaining hole, respectively.

In order to keep the mold in the assembled state, the first pin and the second pin are inserted in the first retaining hole and in the second retaining hole, respectively, from an end side of the first retaining hole and of the second retaining hole facing away from the parting surface, until they cooperate with the retaining portion of the first and of the second retaining hole, respectively. By way of the first pin and the second pin, the clamping force can be applied to the first and second part mold, which are consequently pressed against each other.

By way of the first and the second retaining hole, the application point of the clamping force can be arranged closer to the parting surface, depending on the position of the retaining portion in the first and the second retaining hole, and closer to the longitudinal axis of the mold, depending on their radial distance from the longitudinal axis. At the same time, a tight clamping of the first mold part and the second mold part can be achieved, which in turns results in an efficient transmission of vibrations between the first and the second mold parts.

In a preferred embodiment, the first retaining hole can be formed as a first blind hole and the second retaining hole can be formed as a second blind hole. In this embodiment the retaining portion of the first and the second retaining hole are formed by the bottom of the first and the second blind hole, respectively. The first pin and the second pin are designed to cooperate with the bottom of the first blind hole and the second blind hole, respectively, to retain the mold in the assembled state. This arrangement allows a particularly simple construction of the mold.

It is also possible that the first and the second retaining hole are formed as a through hole through the first mold part and the second mold part, respectively, with a constriction of the bore forming a retaining portion blocking the insertion of the first and the second pin further in the direction to the parting surface.

Preferably, the retaining portion is located on the end side of the first and the second retaining hole facing the parting surface.

In such an embodiment the first pin and the second pin can be inserted in the first and the second retaining hole, respectively, until they reach the constriction of the bore, which prevents further inserting of the first pin and the second pin and consequently retain the mold in the assembled state. This construction allows a modification of the mechanical properties of the first and the second mold part along the corresponding through hole.

In a preferred embodiment, the first pin and the second pin have a cylindrical section of constant diameter and protrude from the first and second mold part, respectively, when they cooperate with the restriction portion of the first and the second retaining hole, respectively. This embodiment is preferred when the first and the second retaining hole are formed as blind holes. However, depending on the form of the retaining portion of the first and the second retaining holes, the form of the first pin and the second can be adapted depending on the type of cooperation required between these parts.

For example, the first and the second retaining hole can each have a section forming a retaining portion, preferably located on the end side of the first and the second retaining hole facing the parting surface, with a diameter less than the diameter of the first and of the second pin, respectively.

It is preferred that the first retaining hole and the second retaining hole are centered along a retaining hole axis substantially perpendicular to the parting surface to ensure that the clamping force applied on the first mold part and on the second mold part by way of the first pin and the second pin when they are inserted in the first retaining hole and the second retaining hole, respectively, are acting along this same retaining hole axis, i.e. perpendicularly to parting surface. In this way, the clamping of the first mold part and the second mold part can be further improved, so that an efficient transmission of vibrations between the two mold parts can be achieved.

In a preferred embodiment, the clamping force ranges from 125 kN to 500 kN, more preferably from 200 kN to 450 kN, most preferably from 300 kN to 450 kN. In the range 125 kN to 500 kN, the clamping force is high enough to ensure a transmission of the vibration allowing the mold to reach the resonant frequency. Consequently, the vibrations of the walls of the mold cavity result in the improved filling of the mold cavity already described above. In the range 200 kN to 450 kN, the stability of the resonant frequency can be further increased, and the effect further optimized. The range 300 kN to 450 kN has shown optimal experimental results.

In a preferred embodiment, the powder injection molding apparatus comprises a guiding element which is designed to bring the first mold part and the second mold part in contact with each other or to separate them from each other. The guiding element drives the first mold part and the second mold part in a direction perpendicular to the parting surface, which direction defines a longitudinal axis of the mold.

The guiding element and the clamping unit are designed such that the first pin can be inserted in the first retaining hole and the second pin can be inserted in the second retaining hole, when the first mold part and the second mold part are brought in contact. This construction is simple and allows a precise guiding of the first mold part and the second mold part by way of the cooperation of the first and second pins with the first and second retaining holes, respectively.

In a preferred embodiment, the clamping unit can comprise a fixed part to which the second pin is preferably removably attached and a movable part to which the first pin is preferably removably attached. The movable part can be moved relative to the fixed part along the longitudinal axis.

This arrangement implies that only the movable part must be guided which simplifies the construction of the apparatus and its costs.

Similarly to the powder injection molding apparatus described previously, wherein the mold has the mono-bloc configuration, the powder injection molding apparatus, wherein the mold has the bi-bloc configuration, can further comprise between the transducer and the mold an amplitude transformer for transforming the wave amplitude of the vibrational energy received from the transducer and transferring it to the mold.

Further, the transducer or the amplitude transformer can be in direct contact with the mold and optionally the injection unit and/or the transfer channel. This embodiment is preferred to further reduce the dispersion of vibrational energy in the apparatus.

In a preferred embodiment, the vibrational energy generator and the transducer are arranged such that the vibrational energy is transduced in the longitudinal direction, i.e. perpendicular to the parting surface. This embodiment allows the transmission and distribution of vibrational energy to the mold symmetrical to the longitudinal axis and supports the generation of vibration having a longitudinal axis of symmetry.

In a preferred embodiment, the application point of the clamping force in the first retaining hole and the application point of the clamping force in the second retaining hole, respectively, lie at a distance from the parting surface of 5 mm to 20 mm, preferably of 7 mm to 15 mm, more preferably 10 mm. The distance from the application point of the clamping force in the first retaining hole to the parting surface has an influence on the transmission of vibrations from the first mold part to the second mold part and on the mechanical resistance of the first mold part. Conversely, this applies also to the second mold part. In the distance range of 5 mm to 20 mm, the transmission of these vibrations to the second mold part allows to reach a stable resonant frequency. The stability as well as the mechanical resistance of the first and second mold parts can be further improved in the distance range of 7 mm to 15 mm. A distance of 10 mm has proven to be optimal in experimental conditions.

In the preferred embodiment, in which the first and the second retaining hole are formed as a blind hole, the application point of the clamping force corresponds to the bottom of the blind hole.

In the preferred embodiment, in which the first and the second retaining hole are formed with a constriction of the bore forming a retaining portion blocking the insertion of the first and the second pin, the application point of the clamping force corresponds to the point in the first and the second retaining hole at which the first and the second pin are blocked, respectively.

Preferably, the application point of the clamping force in the first retaining hole and the application point of the clamping force in the second retaining hole lie at the same distance of the parting surface. This embodiment supports the generation of vibrations symmetrical to the parting surface.

In a preferred embodiment, the first mold part and the second mold part comprise a plurality of first retaining holes and a plurality of second retaining holes, respectively, distributed around the mold cavity. Further, the clamping unit comprises a plurality of first pins and a plurality of second pins. The plurality of first pins and the plurality of second pins are meant to be inserted in the plurality of first retaining holes and of second retaining holes, respectively. In the assembled state of the mold, the plurality of first pins and the plurality of second pins cooperate with the retaining portion of the plurality of first retaining holes and of second retaining holes, respectively, to retain the first mold part and the second mold part in contact with each other under the action of the clamping force. This embodiment has the advantage that the first mold part and the second mold part can be tightly retained in contact around the mold cavity to ensure an optimal transmission of vibrations between the two mold parts around the mold cavity.

In a preferred embodiment, the plurality of first pins and the plurality of second pins as well as the plurality of first retaining holes and the plurality of second retaining holes are distributed symmetrically to the longitudinal axis of the mold. This arrangement supports the formation of a wave pattern in the mold which is symmetrical to the longitudinal axis. In a preferred embodiment, the mold is designed such that the application point of the clamping force in the first retaining hole and the application point of the clamping force in the second retaining hole lie at least approximately at a node and the parting surface at least approximately at an antinode of the resonant frequency of the mold. Such an embodiment allows a maximum transmission of vibrations from the first to the second mold part and vice versa because of the antinode located at the parting surface. Further, it ensures a reduced loss of vibrational energy because of the node located at the application points clamping force. An improved filling of the mold cavity can be achieved in this configuration.

In the preferred embodiment, in which the first and the second retaining hole are formed as a blind hole, this means that the mold is designed such that the bottom of the first blind hole and the bottom of second blind hole lie at least approximately at a node and the parting surface at least approximately at an antinode of the resonant frequency of the mold.

Apart from the mold, whether in the mono-bloc or in the bi-bloc configuration of the mold, also the injection unit can optionally be subjected to the application of vibrational energy and in this regard can be in direct contact with the amplitude transformer, as mentioned above. If this is case, vibrational energy is typically transduced to the barrel and/or the nozzle of the injection unit.

As will be discussed by means of the figures, the transfer channel can be formed in the mold. In this embodiment, the application of vibrational energy on the mold automatically results in the application of vibrational energy on the feedstock contained both in the transfer channel and the mold cavity.

EXAMPLES

The present invention is further illustrated by way of the following examples together with the attached figures, of which FIG. 1 shows schematically a powder injection molding apparatus where the mold has a bi-bloc configuration according to the present invention;

Figure 1:
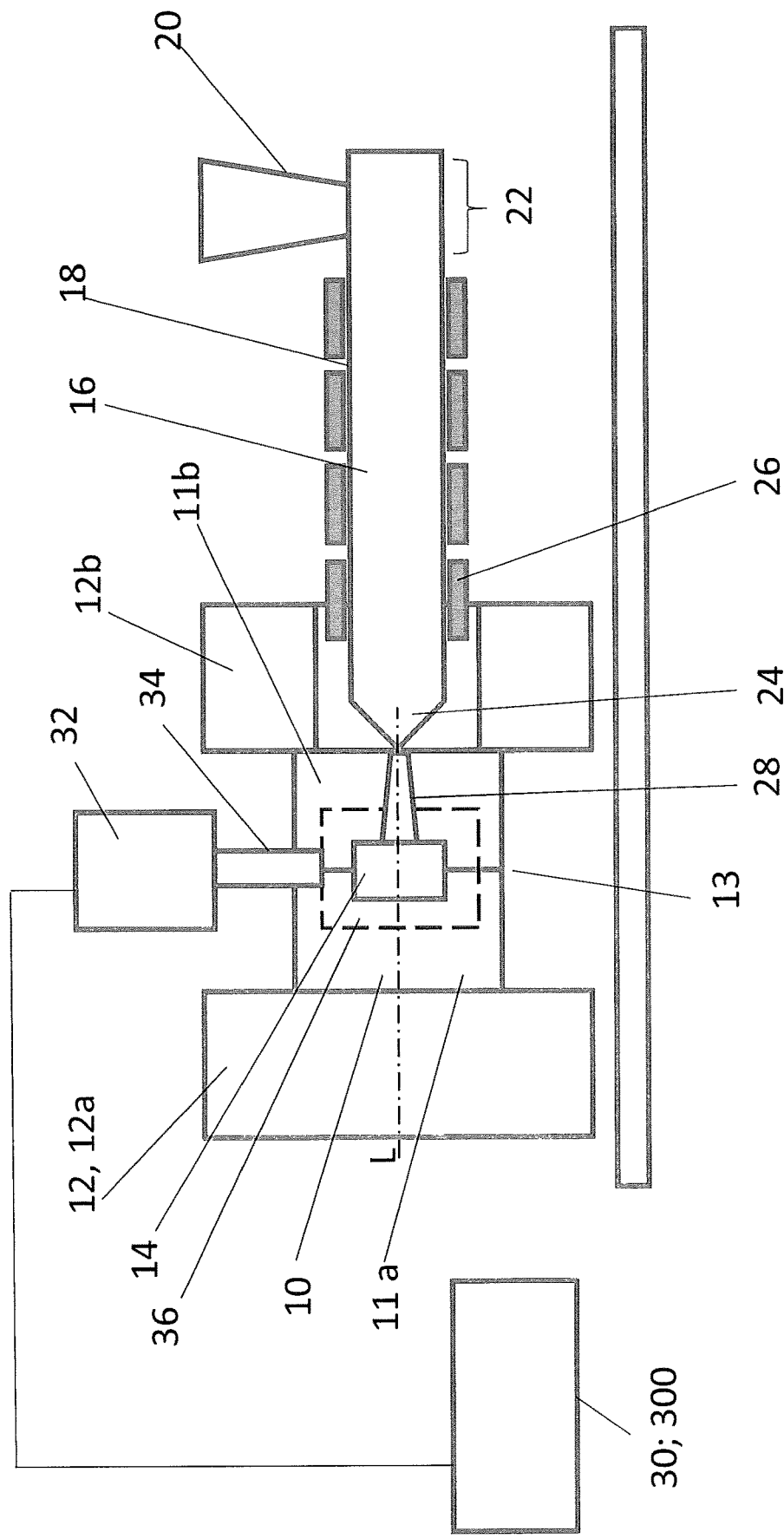

As shown in FIG. 1, the powder injection molding apparatus comprises a mold 10 containing two mold parts, namely a first mold part 11a and a second mold part 11b, clamped together by a clamping unit 12 and enclosing a mold cavity 14.

The first mold part 11a has a first contact surface facing the second mold part in the assembled state and the second mold part has a second contact surface facing the first mold part in the assembled state. The first and the second contact surface form in the assembled state of the mold a parting surface 13 between the first mold part 11a and the second mold part 11b.

The clamping unit 12 designed to retain the first mold part 11a and the second mold part 11b in contact with each other under the effect of a clamping force. The clamping unit 12 comprises a fixed part 12b and a movable part 12b, wherein the movable part 12a can be moved relative to the fixed part 12b along the longitudinal axis L.

The powder injection molding apparatus also comprises a guiding element not shown in FIG. 1, which is designed to bring the first mold part 11a and the second mold part 11b in contact with each other or to separate them from each other. The guiding element drives the first mold part 11a and the second mold part 11b in a direction perpendicular to the parting surface, which direction defines a longitudinal axis L of the mold.

The apparatus further comprises an injection unit 16 containing a barrel 18 extending along the longitudinal axis L and arranged on the side of the fixed part 12b opposed to the mold, a hopper 20 for feeding the feedstock into a feed zone 22 of the barrel, a nozzle 24 and a screw (not shown) arranged axially in the barrel and designed for conveying the feedstock in direction from the feed zone 22 towards the nozzle 24, thereby passing a compression zone and a metering zone (not shown) of the barrel. For heating the feedstock on its path towards the nozzle 24, heating elements 26 encasing the barrel 18 are provided.

The nozzle 24 opens into a transfer channel 28 arranged in the mold 10 and leading into the mold cavity 14.

The apparatus further comprises a vibrational energy generator 30 in the form of an ultrasound-generator 300 as well as a transducer 32 for transducing the vibrational energy received from the ultrasound-generator 300 to the mold 10. Between the transducer 32 and the mold 10, an amplitude transformer (or "booster") 34 is arranged, designed for amplifying the wave amplitude of the vibrational energy received from the transducer 32. In the embodiment shown in FIG. 1 the transducer 32 is arranged to transmit the vibrational energy in a direction essentially parallel to the parting surface.

As indicated in FIG. 1 with dashed lines, the mold 10 acts as a resonator (or sonotrode) 36, vibrating with standing waves at its resonant frequency and thereby applying vibrational energy to the feedstock. Hence, no additional sonotrode is required within the structure of the apparatus shown in FIG. 1.

Figure 3:
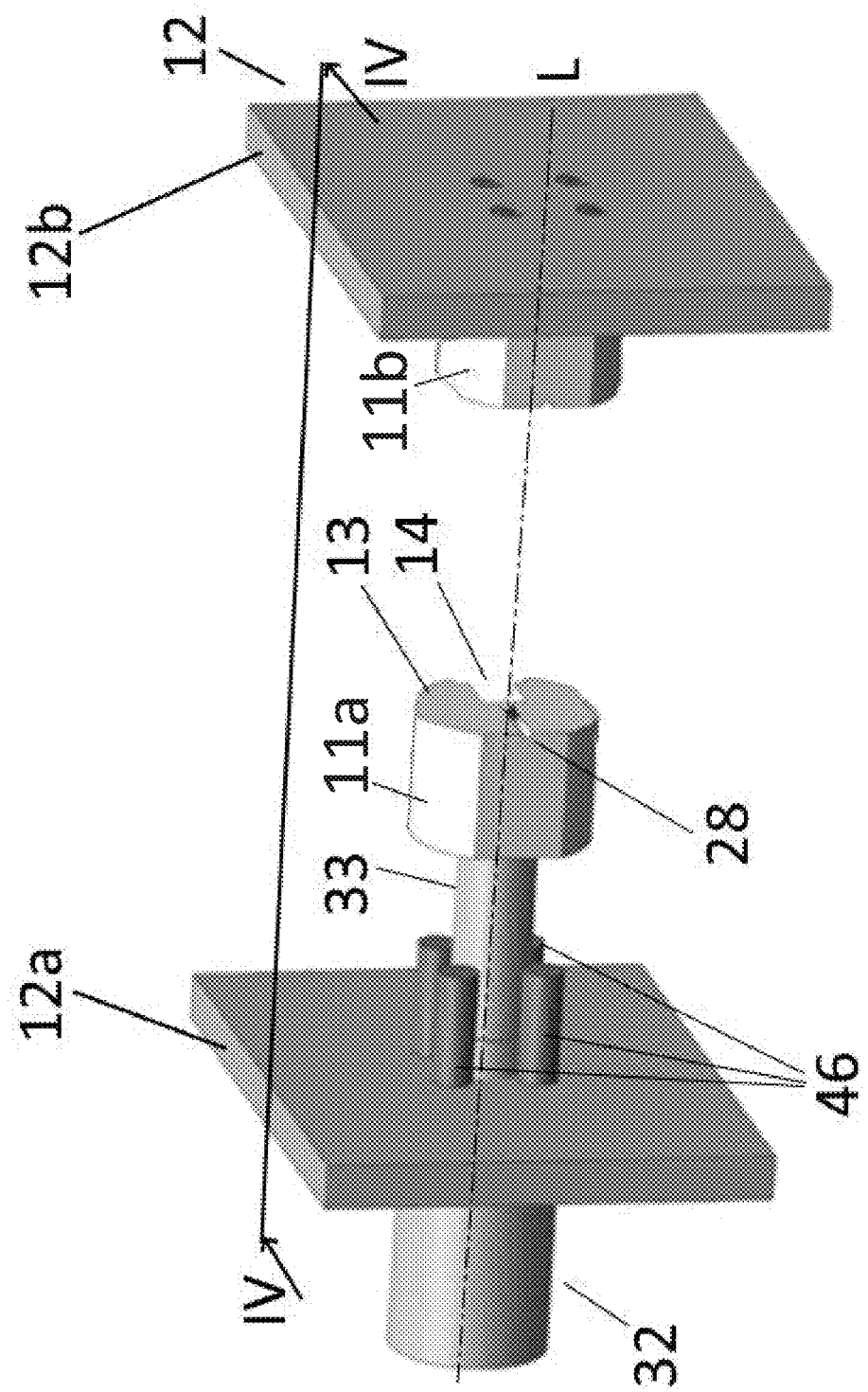
FIG. 3 shows schematically a subassembly of a further embodiment of the powder injection molding apparatus, which subassembly comprises the transducer, the clamping unit and the mold in the separated state.
Figure 4:
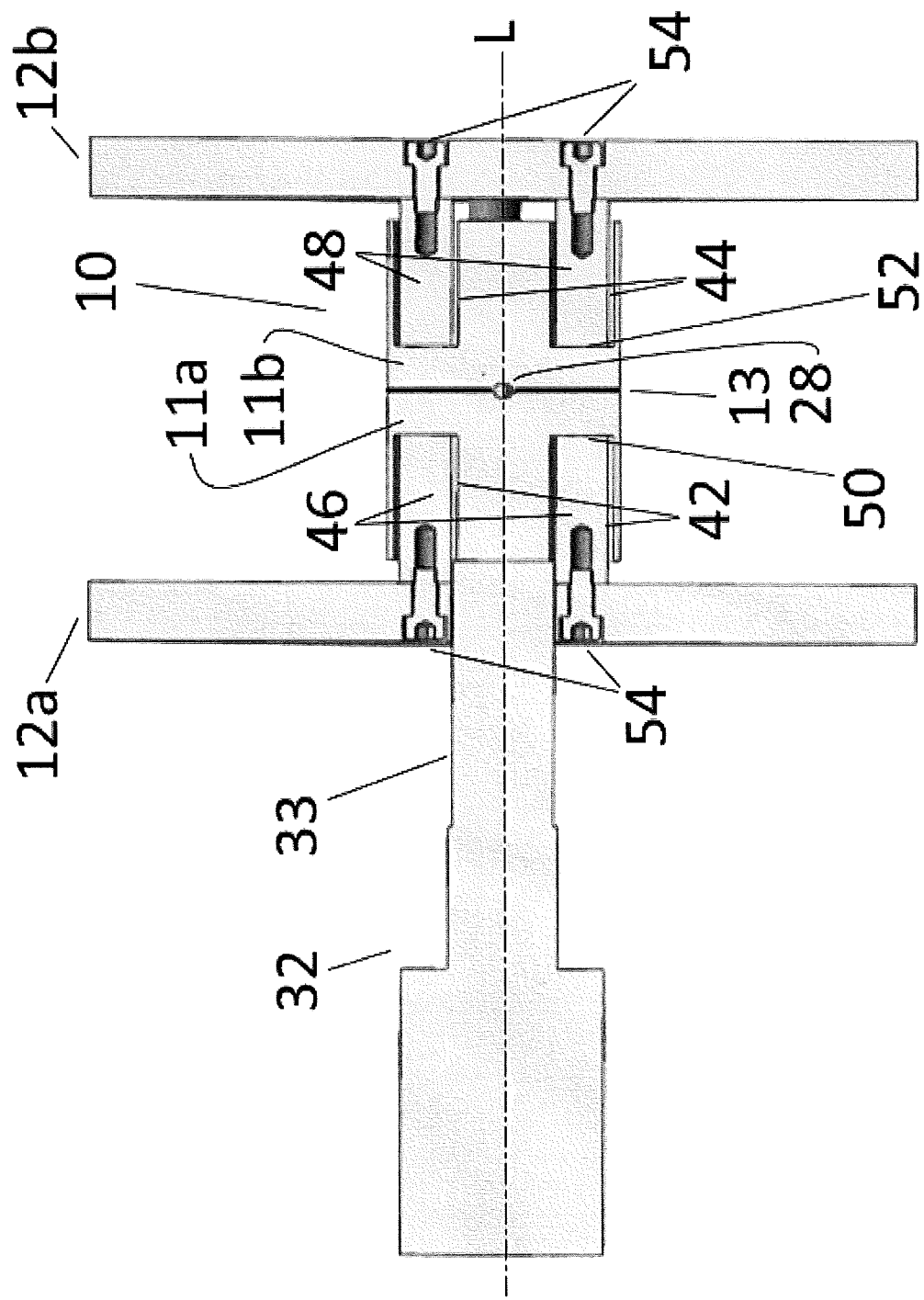
FIG. 4 shows a cross section along the line IV-IV of the subassembly of FIG. 3 in the assembled state of the mold.

The subassembly, including the transducer 32, the clamping unit 12 and the mold 10, shown in FIG. 3 and FIG. 4 is part of a further embodiment of the powder injection molding apparatus, wherein the mold 10 has a bi-bloc configuration and the transducer 32 is aligned with the longitudinal axis of the mold 10.

The same reference numbers are used in FIG. 3 and FIG. 4 for parts with the same effect as for the embodiment of FIG. 1. Further, since the embodiment of FIG. 3 and FIG. 4 is structured similarly to the embodiment of FIG. 1, only the differences are described below. It is noted that the subassembly of FIG. 3 is represented in separated state of the mold 10, whereas FIG. 4 represents the same subassembly in the assembled state of the mold 10.

In the present embodiment, the transducer 32 is connected along the longitudinal axis to the first mold part 11a by way of a spring wave 33 and is arranged to transmit the vibrational energy in a direction essentially perpendicular to the parting surface 13.

The first mold part 11a and the second mold part 11b are each made of massive, essentially cylindrical bloc extending along the longitudinal axis L and form a planar parting surface 13. The mold cavity 14 is formed at the parting surface 13 and is fluidically connected to the hopper 20 (not shown) for feeding the feedstock by way of the transfer channel 28 extending radially with respect to the longitudinal axis L.

The first mold part 11a and the second mold part 11b comprise four cylindrical first retaining holes in the form of blind holes 42 and four cylindrical second retaining holes in the form of blind holes 44, respectively, each extending essentially perpendicularly to the parting surface 13 and arranged opposite to each other respective to the parting surface 13 as illustrated in FIG. 4. The axis of the four first blind holes 42 are arranged at the corner of a square centered on the longitudinal axis. The four second blind holes 44 are arranged similarly to the four first blind holes 42.

Further, the clamping unit 12 comprises four cylindrical first pins 46 fixed by way of screws 54 to the movable part 12a and four cylindrical second pins 48 fixed by way of screws 54 to the fixed part 12b. The four first pins 46 and the four second pins 48 extend essentially perpendicularly to the parting surface 13. Further, the axis of the four first pins 46 are also arranged at the corner of a square centered on the longitudinal axis and the four second pins 48 are arranged similarly to the four first pins 46.

The diameter and the length of the four first pins 46 and of the four second pins 48 is chosen such that they can be inserted in the four first blind holes 42 and in the four second blind holes 44, respectively, and cooperate in the assembled state of the mold with a retaining portion in the form of a bottom 50 of the first blind holes and with a retaining portion in the form of a bottom 52 of the second blind holes to retain the first mold part 11a and the second mold part 11b in contact with each other.

Using a CIM apparatus as schematically illustrated in FIG. 1, a ceramic part made of yttria-stabilized zirconia was prepared as follows:

A feedstock of yttria-stabilized zirconia powder dispersed in a binder (Tosoh PXA 233PH) was provided and filled into the mold cavity of the injection molding apparatus.

Prior to injection, the mold had been subjected to a pre-drying at a drying temperature in a range from 40° to 60° C. for about 6 hours. For injection, the temperature of the mold was set to about 30° C.

The temperature of the feedstock increased from its path from the feed zone to the nozzle, according to Table 1 below:

TABLE 1

| Temperature profile of feedstock | |
|---|---|
| Feed zone | 110° C. |
| Compression zone | 150° C. |
| Metering zone | 170°-190° C. |
| Nozzle | 180°-200° C. |

Injection was carried out at an injection speed of 10 ccm/s and an injection pressure of 800 bar, followed by a holding period of 20 seconds at 800 bar. During the injection and the holding period, vibrational energy was applied to the mold, the frequency of the vibration being 20.98 kHz at a starting phase and 21.94 kHz at a subsequent working phase.

The resulting green body was then debinded in air, according to the temperature scheme shown in Table 2:

TABLE 2

| Temperature scheme for debinding | |
| --- | --- |
| Temperature rise from room temperature to 150° C.: | 1.5 hours |
| Keeping temperature at 150° C. | 0.5 hour |
| Temperature rise from 150° C. to 400° C.: | 25 hours |
| Temperature rise from 400° C. to 450° C. | 1 hour |
| Keeping temperature at 450° C. | 2 hours |
| Temperature decrease from 450° C. to room temperature | Natural cooling |

Finally, the debinded brown body was then sintered according to the temperature scheme given in Table 3:

TABLE 3

| Temperature scheme for sintering | |
| --- | --- |
| Temperature rise from room temperature to 800° C.: | 8 hours |
| Keeping temperature at 800° C. | 1 hour |
| Temperature rise from 800° C. to 1000° C.: | 2 hours |
| Temperature rise from 1000° C. to 1450° C. | 9 hours |
| Keeping temperature at 1450° C. | 2 hours |
| Temperature decrease from 1450° C. to room temperature | Natural cooling |

In a first series of tests, the effect of subjecting the mold to ultrasonic vibration on the bend strength of a cylindrical molded article was examined. To this end, cylindrical articles were produced by injecting different commercial feedstocks (Catamold TZP-A, PXA 211PH, PXA 233PH, TCP 0036) into a radial bi-bloc mold, but under different process parameters as given in Table 4:

TABLE 4

| Process parameters of first test series | | | | |
| --- | --- | --- | --- | --- |
| Sample No. | Feedstock | Use of ultrasonic vibration during injection | Holding parameters | Bend strength |
| 1.1 | Catamold TZP-A | yes | 800 bar for 30 seconds | 997 ± 72 MPa |
| 1.2 | Catamold TZP-A | no | 800 bar for 30 seconds | 794 ± 152 MPa |
| 1.3 | PXA 211PH | yes | 1000 bar for 30 seconds | 1199 ± 92 MPa |
| 1.4 | PXA 211PH | no | 1000 bar for 30 seconds | 943 ± 147 MPa |
| 1.5 | PXA 233PH | yes | 600 bar for 20 seconds | 1102 ± 118 MPa |
| 1.6 | PXA 233PH | no | 600 bar for 20 seconds | 918 ± 111 MPa |
| 1.7 | TCP 0036 | yes | 1000 bar for 30 seconds | 958 ± 117 MPa |
| 1.8 | TCP 0036 | no | 1000 bar for 30 seconds | 726 ± 137 MPa |

Thus, for all feedstocks given in Table 4, a bend strength increase was determined. Specifically, the highest increase (of 24%) has been determined for feedstock TCP 0036, whereas the highest absolute bend strength was determined for PXA 211PH.

In a further series of tests, the impact of the holding pressure on the molded cylindrical samples based on feedstock TCP 0036 has been analysed, leading to the results shown in Table 5.

TABLE 5

| Analysis of impact of holding pressure | | | |
| --- | --- | --- | --- |
| Sample No. | Use of ultrasonic vibration during injection | Holding parameters | Bend strength |
| 2.1 | yes, for a duration of 30 seconds | 1000 bar for 30 seconds | 958 ± 117 MPa |
| 2.2 | no | 1000 bar for 30 seconds | 726 ± 137 MPa |
| 2.3 | yes, for a duration of 30 seconds | 1200 bar for 30 seconds | 1004 ± 162 MPa |
| 2.4 | no | 1200 bar for 30 seconds | 795 ± 71 MPa |

In a still further series of tests, a molded article as shown in FIG. 4 has been prepared. To this end, feedstock PXA 233PH has been injected into a radial mono-bloc mold under different injection and vibration parameters, as given in Table 6.

TABLE 6

| Process parameters for molding article of more complex geometry | | | |
| --- | --- | --- | --- |
| Sample No. | Use of ultrasonic vibration during injection | Holding parameters | Bend strength |
| 3.1 | yes, for a duration of 10 seconds | 400 bar for 10 seconds | 776 ± 127 MPa |
| 3.2 | no | 400 bar for 10 seconds | 586 ± 146 MPa |
| 3.3 | yes, for a duration of 10 seconds | 800 bar for 10 seconds | 769 ± 142 MPa |
| 3.4 | no | 800 bar for 10 seconds | 568 ± 133 MPa |

Figure 2:
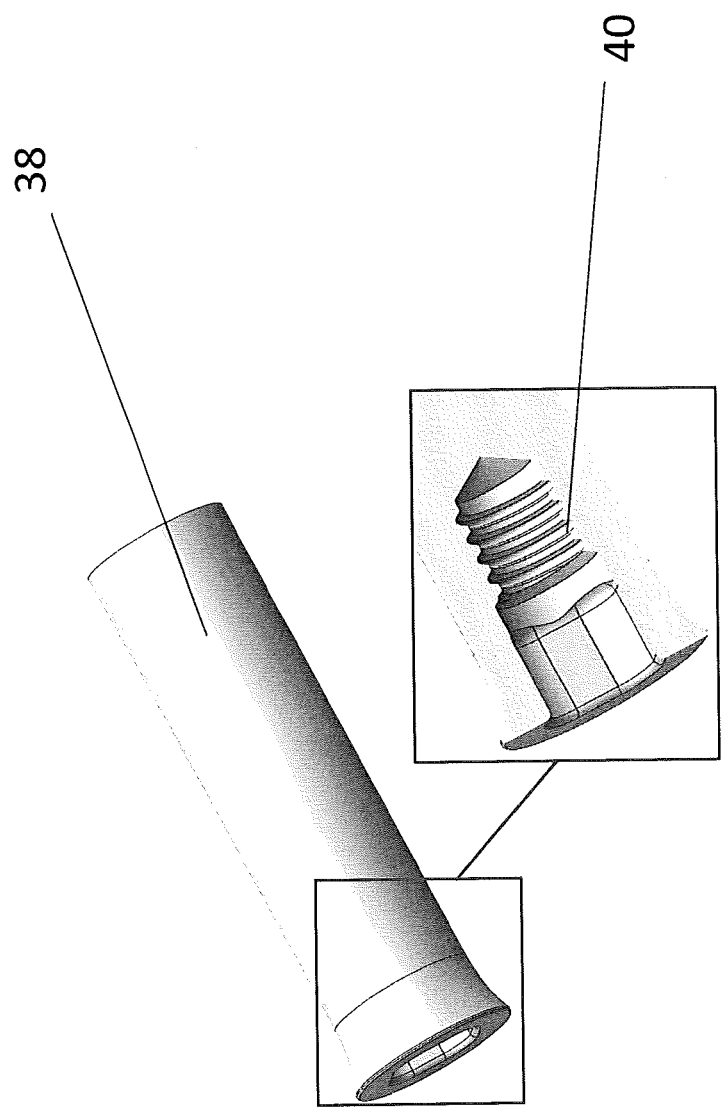
FIG. 2 shows an article obtainable by the process of the present invention using an apparatus as shown in FIG. 1.
Figure 5:
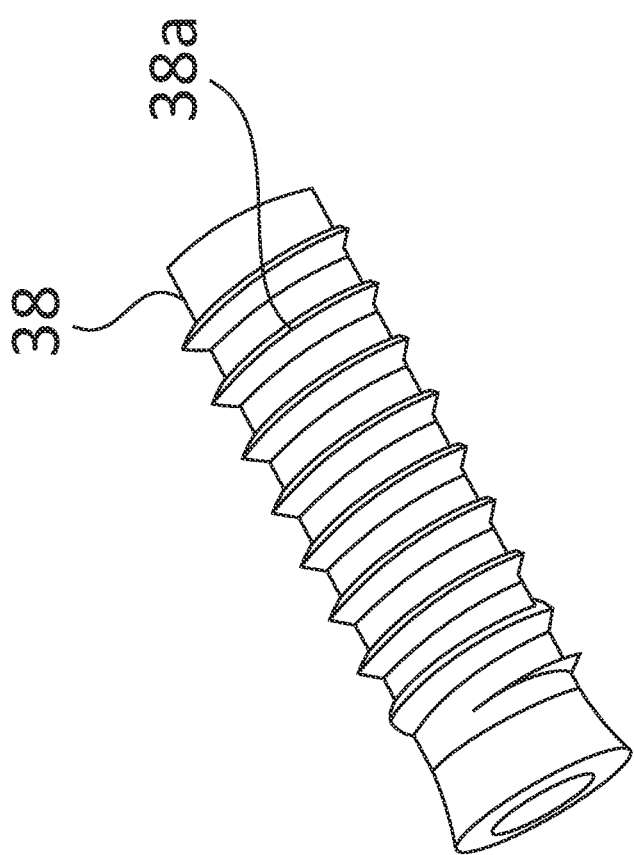
FIG. 5 shows a dental implant having external threads obtainable by the process and/or apparatus disclosed herein.

By the process described above, the molded article shown in FIG. 2 was prepared using an apparatus as schematically depicted in FIG. 1 featuring a bi-bloc mold of a respective inner geometry. The specific molded article 38 had the shape of a dental article comprising an inner thread 40 (for connecting an abutment), but which in the portion to be inserted into bone did not exhibit an outer thread for a primary fixation of the implant, said portion being thus cylindrical. An example of a molded article 38 having a shape of a dental implant comprising an external thread 38a is shown in FIG. 5.

Analysis of the bend strength of these samples confirmed the results given above. Specifically, a bend strength improvement of 32% was determined for the samples subjected to a holding pressure of 400 bar and of 35% for the samples subjected to a holding pressure of 800 bar.

The examples thus show that also for complex geometries such as the one shown in FIG. 4 having an inner thread, an improved bend strength is achieved, proving that the present invention can be applied to the preparation of a dental implant.

A still further bend strength improvement has been achieved by the additional use of an amplitude transformer ("booster"), by which the wave amplitude of the vibrational energy received from the transducer was amplified. The respective results are shown in Table 7 below.

TABLE 7

Impact of amplitude transformation on bend strength improvement

| Sample No. | Use of ultrasonic vibration during injection | Holding parameters | Bend strength |
| --- | --- | --- | --- |
| 4.1 | no | 800 bar for 10 seconds | 640 ± 64 MPa |
| 4.2 | 10 seconds | 800 bar for 10 seconds | 856 ± 79 MPa |
| 4.3 | 10 seconds by use of a booster | 800 bar for 10 seconds | 940 ± 107 MPa |

As shown in Table 7, a bend strength improvement of about 34% was achieved by applying ultrasonic vibration onto the mold, and the improvement was further increased to 47% by the additional use of a booster.

LIST OF REFERENCE NUMERALS 10 mold
11a, b first and second mold parts, respectively
12 clamping unit
12a, b movable and fixed parts, respectively
13 parting surface
14 mold cavity
16 injection unit
18 barrel
20 hopper
22 feed zone
24 nozzle
26 heating elements
28 transfer channel
30; 300 vibrational energy generator; ultrasound-generator
32 transducer
33 spring wave
34 amplitude transformer
36 resonator
38 molded article
40 inner thread
42 first blind holes, first retaining holes
44 second blind holes, second retaining holes
46 first pin
48 second pin
50 bottom of the first blind holes, retaining portion of the first retaining holes
52 bottom of the second blind holes, retaining portion of the second retaining holes
54 screw
L longitudinal axis

The invention claimed is:

1. A process for preparing a dental implant or a dental implant abutment by powder injection molding, the process comprising: a) providing a feedstock containing a powder of a ceramic, a metal or a metal alloy dispersed in a binder, b) heating the feedstock, and c) injecting the heated feedstock into a mold cavity of a mold, where the heated feedstock cools and hardens to a configuration of the mold cavity, wherein: the heating of the feedstock according to step b) is at least partially carried out in a barrel, from which the heated feedstock is transferred through a transfer channel to the mold cavity of the mold, the barrel and the transfer channel being vibrated at a frequency corresponding to a resonant frequency of the barrel and the transfer channel by receiving vibrational energy transmitted to the barrel and the transfer channel by a transducer, step c) is carried out under an application of vibrational energy onto the feedstock, and the mold is subjected to vibration at a frequency corresponding to a resonant frequency of the mold, wherein the mold comprises a first mold part and a second mold part, which are retained in contact with each other by means of a clamping unit under an effect of a clamping force in a range of from 125 kN to 500 kN to form a parting line in the form of a parting surface, and points of application of the clamping force in the first mold part and the second mold part, respectively, lie at a distance from the parting surface in a range of 5 mm to 20 mm.

2. A powder injection molding apparatus for carrying out the process according to claim 1, comprising
   A) an injection unit containing a heatable barrel, a nozzle and conveying means arranged in the barrel for conveying feedstock in direction from a feed zone of the barrel towards the nozzle, and
   B) a mold enclosing a mold cavity fluidically connected with the injection unit via a transfer channel, wherein the apparatus further comprises
   C) a vibrational energy generator and a transducer for transducing the vibrational energy received from the vibrational energy generator to the mold.

3. The powder injection molding apparatus according to claim 2, wherein between the transducer and the mold the apparatus further comprises an amplitude transformer for transforming the wave amplitude of the vibrational energy received from the transducer and transferring it to the mold.

4. The powder injection molding apparatus according to claim 3, wherein the transducer or the amplitude transformer is in direct contact with the mold.

5. A process comprising preparing a dental article using the powder injection molding apparatus according to claim 2.

6. The process according to claim 1, wherein the mold is subjected to vibration at a frequency above 10 kHz.

7. The process according to claim 1, wherein the mold is subjected to ultrasonic vibration.

8. The process according to claim 1, wherein the mold is kept at a temperature in a range from room temperature to 60° C.

9. The process according to claim 1, wherein the feedstock comprises zirconia powder.

10. The process according to claim 1, further comprising:
    d) obtaining a molded article produced in step c), and subjecting the obtained molded article to a machining process to produce a dental implant or a dental implant abutment.

11. The process according to claim 10, wherein the dental implant produced in step d) comprises an internal thread and an external thread, the internal thread being formed in step c) and the external thread being formed in step d).

12. The process according to claim 1, wherein the vibrational energy transmitted to the barrel and the transfer channel by the transducer is transmitted from the barrel and the transfer channel to the feedstock present in the barrel and the transfer channel.

13. The process according to claim 1, wherein the heating of the feedstock according to step b) is at least partially carried out by heaters encasing the barrel.

* * * * *